(12) United States Patent
Piotrowski et al.

(10) Patent No.: US 11,760,232 B2
(45) Date of Patent: Sep. 19, 2023

(54) MOTOR VEHICLE SEAT

(71) Applicant: Faurecia Autositze GmbH, Hannover (DE)

(72) Inventors: Marcin Piotrowski, Lesznowola (PL); Michael Lücke, Hannover (DE); Jenny Schmitz, Hessisch Oldendorf (DE); Oriana Gramatyka, Warsaw (PL); Dariusz Stasik, Nowe Brusno (PL)

(73) Assignee: FAURECIA AUTOSITZE GMBH, Hannover (DE)

( * ) Notice: Subject to any disclaimer, the term of this patent is extended or adjusted under 35 U.S.C. 154(b) by 0 days.

(21) Appl. No.: 17/699,390

(22) Filed: Mar. 21, 2022

(65) Prior Publication Data

US 2022/0305960 A1 Sep. 29, 2022

(30) Foreign Application Priority Data

Mar. 29, 2021 (DE) ...................... 10 2021 107 897.0

(51) Int. Cl.
*B60N 2/02* (2006.01)
(52) U.S. Cl.
CPC ......... *B60N 2/0276* (2013.01); *B60N 2/0232* (2013.01)
(58) Field of Classification Search
CPC .. B60N 2/0276; B60N 2/0232; B60N 2/1817; B60N 2/181; B60N 2/1842; B60N 2/1864; B60N 2002/0236; B60N 2002/024
USPC .................................................... 297/216.12
See application file for complete search history.

(56) References Cited

U.S. PATENT DOCUMENTS

| | | |
|---|---|---|
| 5,112,018 A | 5/1992 | Wahls |
| 5,292,164 A | 3/1994 | Rees |
| 5,337,995 A | 8/1994 | Satoh et al. |
| 5,467,957 A * | 11/1995 | Gauger ................. B60N 2/067 74/89.33 |
| 5,816,555 A | 10/1998 | Ito et al. |

(Continued)

FOREIGN PATENT DOCUMENTS

| | | |
|---|---|---|
| CN | 201856665 U | 6/2011 |
| DE | 3201309 * | 7/1983 |

(Continued)

OTHER PUBLICATIONS

Office Action, including Search Report, for German Patent Application No. 10 2021 107 897.0, dated Mar. 29, 2021, 10 pages.

(Continued)

*Primary Examiner* — Mark R Wendell
(74) *Attorney, Agent, or Firm* — Westman, Champlin & Koehler, P.A.

(57) ABSTRACT

The invention relates to a motor vehicle seat with a seat inclination adjustment device, with a first base element, a first seat frame element and a first actuator element, wherein the actuator element has a lower link arm connected to the base element via a lower link and movably arranged relative to the base element, an upper link arm connected to the lower link arm via a middle link and movably arranged relative to the lower link arm, wherein the upper link arm is connected to the seat frame element via an upper link and is arranged movably, and an inclination adjustment fitting with a first and a second fitting part, and wherein the inclination adjustment fitting is arranged on one of the links.

14 Claims, 7 Drawing Sheets

(56) References Cited

U.S. PATENT DOCUMENTS

| | | | |
|---|---|---|---|
| 5,964,441 A | 10/1999 | Gauger et al. | |
| 5,988,581 A * | 11/1999 | Freund | B60N 2/0296 |
| | | | 296/65.15 |
| 6,089,665 A * | 7/2000 | Andrigo | B60N 2/06 |
| | | | 297/344.11 |
| 6,309,019 B1 * | 10/2001 | Downey | B60N 2/0224 |
| | | | 297/344.13 |
| 6,340,208 B1 | 1/2002 | Habedank | |
| 6,616,117 B2 * | 9/2003 | Gryp | B60N 2/501 |
| | | | 248/588 |
| 7,240,965 B2 | 7/2007 | Messerschmidt et al. | |
| 7,472,879 B2 * | 1/2009 | Weber | B60N 2/067 |
| | | | 248/429 |
| 7,611,436 B2 | 11/2009 | Ito | |
| 8,240,766 B2 | 8/2012 | Gilbert et al. | |
| 8,616,645 B2 | 12/2013 | Ito | |
| 9,908,439 B2 | 3/2018 | Kanehira et al. | |
| 2003/0178875 A1 | 9/2003 | Ito et al. | |
| 2006/0061197 A1 | 3/2006 | Messerschmidt et al. | |
| 2007/0032332 A1 | 2/2007 | Ito | |
| 2010/0187396 A1 | 7/2010 | Gilbert et al. | |
| 2013/0161989 A1 | 6/2013 | Ito | |
| 2022/0305965 A1 | 9/2022 | Lücke et al. | |

FOREIGN PATENT DOCUMENTS

| | | |
|---|---|---|
| DE | 32 01 309 C2 | 11/1985 |
| DE | 69219029 T2 | 7/1997 |
| DE | 197 56 272 C1 | 7/1999 |
| DE | 10 2004 011 138 A1 | 9/2005 |
| DE | 102009006387 A1 | 7/2010 |
| EP | 1626879 A1 | 2/2006 |
| EP | 1663702 A1 | 6/2006 |
| EP | 2617601 A1 | 7/2013 |
| JP | 4958471 B2 | 6/2012 |
| KR | 101776515 B1 | 9/2017 |
| WO | 2004103766 A1 | 12/2004 |
| WO | 2005025930 A2 | 3/2005 |
| WO | 2015032639 A1 | 3/2015 |

OTHER PUBLICATIONS

English translation of Office Action, including Search Report, for German Patent Application No. 10 2021 107 896.2, dated Mar. 29, 2021, 22 pages.

English translation of Office Action, including Search Report, for German Patent Application No. 10 2021 107 897.0, dated Mar. 29, 2021, 22 pages.

Office Action, including Search Report, for German Patent Application No. 10 2021 107 896.2, dated Mar. 29, 2021, 10 pages.

Non-Final Rejection for U.S. Appl. No. 17/702,144, dated May 25, 2023, 8 pages.

* cited by examiner

MOTOR VEHICLE SEAT

CROSS-REFERENCE TO RELATED APPLICATION

This application claims priority to German Patent Application No. 10 2021 107 897.0, filed on Mar. 29, 2021, the content of which is incorporated herein by reference.

BACKGROUND

Motor vehicle seats often have an inclination adjustment for the seat cushion, with which a user can adjust the angle of inclination of the seat cushion. To do this, the front of the seat cushion is raised or lowered. This inclination adjustment can also be coupled with a seat height adjustment, with the front and back of the seat cushion being able to be adjusted in height.

Motor vehicle seats that are used, for example, in vehicles for passenger transport (such as buses, trains, etc.) often have a belt system that is integrated into the motor vehicle seat. Such a motor vehicle seat is exposed to strong forces in the front area of the inclination adjustment, particularly in the event of a frontal collision. In addition, a large adjustment range of the angle of inclination is desirable in order to enable the occupant to sit in a relaxed position. Last but not least, such motor vehicle seats have a small width, so the inclination adjustment must have compact dimensions.

US 2003 0178875 A1 discloses an inclination adjustment that is arranged on a longitudinal side of the motor vehicle seat. The inclination adjustment includes a drive mechanism attached to a base plate portion of a seat cushion to drive a cushion frame to be movable in a vertical direction relative to the base plate portion. The drive mechanism includes a shaft having a first axial portion and a second axial portion positioned on the first axial portion and rotated eccentrically relative to the first axial portion, a first internal gear, a second internal gear, and a pinion mounted on the second axial portion. The number of teeth of the first internal gear is at least one tooth less than the number of teeth of the second internal gear. This inclination adjustment acts only on one longitudinal side of the vehicle seat, the inclination adjustment must therefore be large in order to absorb the strong forces acting in case of a frontal collision.

EP 162 6879 A1 discloses a seat height adjustment for a motor vehicle seat, the disc-shaped, mutually rotatable fitting parts of which axially hold a coupling ring arranged along the circumference, and a structural part to which the fitting is to be fastened. The coupling ring is designed in such a way that it can be integrated into the structural part. This seat height adjustment also acts only on one longitudinal side of the motor vehicle seat and must therefore be dimensioned to be correspondingly large.

EP 166 3702 A2 discloses an angular position adjusting mechanism for an inclination device for adjusting an inclination angle of a seat back or for a vertical device for adjusting a height of a seat cushion. The angular position adjusting mechanism is mounted in a front end portion of the frame of the seat cushion and is connected to a seat slide through a connection mechanism wherein the seat cushion is rotated about a rotary shaft connecting a rear end portion of the frame to the seat slide by turning the operation handle, and such that the height of the seat cushion can be adjusted as desired. This inclination adjustment also acts only on one longitudinal side of the motor vehicle seat.

WO 2015 32639 A1 discloses a motor vehicle seat whose inclination adjustment has a toothed part and a drive device which is in engagement with the toothed part via a drive pinion for pivoting the pivoting part relative to the seat side part. The toothed part can be arranged on the seat side part or the pivoting part, while the drive device is arranged on the other component, i.e. on the pivoting part or the seat side part, in order to bring about a relative movement between the pivoting part and the seat side part by moving the output pinion. The drive device is integrally formed in the seat side part and pivot part. This seat height adjustment also acts only on one longitudinal side of the motor vehicle seat and must therefore be dimensioned to be correspondingly large.

SUMMARY

It is therefore the object of the present invention to provide a motor vehicle seat with a seat inclination adjustment which can compensate for strong forces, in particular during a frontal collision, and thus reduce the risk of injury to an occupant. It is also an object of the present invention to provide a motor vehicle seat with a seat inclination adjustment which has a large adjustment range, requires little space and can be produced inexpensively. It is also an object of the present invention to provide a method for adjusting the seat inclination of a motor vehicle seat, with which strong forces are compensated, particularly during a frontal collision, with which a large adjustment range of the seat cushion is realized and which requires little space.

The object is achieved by means of the motor vehicle seat according to claim 1. Advantageous embodiments of the invention are set out in the dependent claims.

The motor vehicle seat with a seat inclination adjustment device according to the invention has a base element and a seat frame element. The base element is arranged on the longitudinal adjustment of the motor vehicle seat, the seat frame element on the seat frame that accommodates the seat cushion. The motor vehicle seat according to the invention also has a first actuator element. The first actuator element has a lower link arm which is connected to the base element via a lower link and is arranged such that it can move relative to the base element. Furthermore, the first actuator element has an upper link arm which is connected to the lower link arm via a middle link and is arranged such that it can move relative to the lower link arm. The upper link arm is connected to the seat frame element via an upper link and is movably arranged. The first actuator element also has an inclination adjustment fitting with a first and a second fitting part. The seat inclination adjustment device also has a motor. The inclination adjustment fitting can be driven by the motor. The seat inclination can therefore be adjusted in a motorized way, which increases the comfort for a user.

According to the invention, the inclination adjustment fitting is arranged on one of the links. When the first fitting part executes a rotational movement, the second fitting part is driven and also executes a rotational movement. As a result, the lower and upper link arm are pivoted relative to one another in such a way that the angle between the lower and upper link arm changes and the seat frame element is thus raised or lowered.

In another embodiment of the invention, the upper link is located at the front of the seat frame element. The seat frame element is thus raised or lowered in its front area about an axis of rotation, which is arranged in the rear area of the seat frame element.

In a development of the invention, the inclination adjustment fitting is arranged on the lower link. When the inclination adjustment fitting executes a rotational movement, the lower link is pivoted. As a result, the lower and upper link arm are pivoted relative to one another in such a way that the angle between the lower and upper link arm changes and the seat frame element is thus raised or lowered.

In a further embodiment of the invention, the motor is a geared motor. The gear is usually a reduction gear, by means of which the rotational movement of the inclination adjustment fitting driven by the motor is reduced. In addition, the torque on the inclination adjustment fitting is increased.

In a further advantageous embodiment of the invention, the inclination adjustment fittings are mounted in the opposite direction with respect to their use for the backrest inclination adjustment. This has the advantage that the motor can be mounted on the base element.

In a development of the invention, the motor is arranged on the base element. When performing a movement to adjust the seat inclination, the motor is not pivoted but remains at the same height during the adjustment. This also has the advantage of a very compact design.

In an advantageous embodiment of the invention, the inclination adjustment fitting is arranged in the force flow of a force that acts on the motor vehicle seat in the event of a (frontal) collision. As a result, the resistance of the motor vehicle seat to the strong forces that occur is significantly increased by the inclination adjustment fitting acting as a means of compensation. The risk of injury to an occupant is reduced.

In a further embodiment of the invention, the seat inclination adjustment device has a second actuator element. The strong forces acting on the motor vehicle seat during a frontal collision are thus advantageously distributed over two actuator elements.

In a further embodiment of the invention, the first actuator element is arranged on the right and the second actuator element on the left side of the seat. The second actuator element is arranged on the longitudinal side of the motor vehicle seat which is opposite the longitudinal side of the motor vehicle seat on which the first actuator element is arranged. The first and second actuator elements are therefore arranged on opposite longitudinal sides of the motor vehicle seat, preferably in the front area of the motor vehicle seat. The strong forces acting on the motor vehicle seat during a frontal collision are thus advantageously distributed over two actuator elements.

In a further embodiment of the invention, the inclination adjustment fitting of the first actuator element and the inclination adjustment fitting of the second actuator element are connected to one another via a shaft. The motor drives the two actuator elements at the same speed, and the opposite front longitudinal sides of the motor vehicle seat are pivoted at the same speed.

In a further development of the invention, the two actuator elements each have a separate motor, which drives a respective actuator element. In this way, for example, it is possible to pivot the two longitudinal sides of the seat cushion into different positions.

In a further embodiment of the invention, the first fitting part is pivotably connected to the second fitting part. When driving the first fitting part, the second fitting part is also pivoted.

In a development of the invention, the first fitting part has external teeth and the second fitting part has internal teeth. The internal teeth of the first fitting part have at least one tooth more than the external teeth of the second fitting part.

In a further embodiment of the invention, the first fitting part is fastened to a link arm or to the base element or to the seat frame and the second fitting part is fastened to a different link arm than the first fitting part. When an adjustment movement of the seat cushion inclination is carried out, the first fitting part drives the second fitting part and thus pivots the link arm attached to the second fitting part.

In a further embodiment of the invention, the first fitting part is attached to the lower link arm and the second fitting part is attached to the base element. When an adjustment movement of the seat cushion inclination is carried out, the first fitting part drives the second fitting part and thus pivots the lower link arm attached to the second fitting part.

The object is also achieved by the method for adjusting the seat inclination of a motor vehicle seat.

The method according to the invention for adjusting the seat inclination of a motor vehicle seat takes place by actuating an inclination adjustment fitting which is arranged on a link.

The method for adjusting the seat inclination of a motor vehicle seat takes place via a rotational movement of the first fitting part, which is in engagement with a second fitting part. The second fitting part also performs a rotational movement. Both fitting parts are components of an inclination adjustment fitting of the motor vehicle seat. The motor vehicle seat also has a base element and a seat frame element. The motor vehicle seat according to the invention also has a first actuator element. The first actuator element has a lower link arm which is connected to the base element via a lower link and is arranged such that it can move relative to the base element. Furthermore, the first actuator element has an upper link arm which is connected to the lower link arm via a middle link and is arranged such that it can move relative to the lower link arm. According to the invention, the inclination adjustment fitting is arranged on one of the links. When the first fitting part executes a rotational movement, the second fitting part is driven and also executes a rotational movement. As a result, the lower and upper link arm are pivoted relative to one another in such a way that the angle between the lower and upper link arm changes and the seat frame element is thus raised or lowered. The inclination adjustment fitting is also driven by a motor.

In a further embodiment of the invention, the motor is a geared motor. The gear is usually a reduction gear, by means of which the rotational movement of the inclination adjustment fitting driven by the motor is reduced. In addition, the torque on the inclination adjustment fitting is increased.

In a further advantageous embodiment of the invention, the inclination adjustment fittings are mounted in the opposite direction with respect to their use for the backrest inclination adjustment. This has the advantage that the motor can be mounted on the base element.

In a development of the invention, the motor is arranged on the base element. When performing a movement to adjust the seat inclination, the motor is not pivoted but remains at the same height during the adjustment. This also has the advantage of a very compact design.

In a further embodiment of the invention, the first fitting part is fastened to a link arm or to the base element or to the seat frame and the second fitting part is fastened to a different link arm than the first fitting part. When an adjustment movement of the seat cushion inclination is carried out, the first fitting part drives the second fitting part and thus pivots the link arm attached to the second fitting part.

In a further embodiment of the invention, the first fitting part is attached to the lower link arm and the second fitting part is attached to the base element. When an adjustment movement of the seat cushion inclination is carried out, the first fitting part drives the second fitting part and thus pivots the lower link arm attached to the second fitting part.

In an advantageous embodiment of the invention, in the event of a (frontal) collision, the force flow of the forces acting on the motor vehicle seat is routed through the inclination adjustment fitting. As a result, the resistance of the motor vehicle seat to the strong forces that occur is significantly increased by the inclination adjustment fitting acting as a means of compensation. The risk of injury to an occupant is reduced.

Exemplary embodiments of the motor vehicle seat according to the invention with the seat inclination adjustment device also according to the invention and the method according to the invention for adjusting the seat inclination are shown in a schematically simplified manner in the drawings and are explained in more detail in the following description.

The invention relates to a motor vehicle seat with a seat inclination adjustment device, with a first base element, a first seat frame element and a first actuator element, wherein the actuator element has a lower link arm connected to the base element via a lower link and movably arranged relative to the base element, an upper link arm connected to the lower link arm via a middle link and movably arranged relative to the lower link arm, wherein the upper link arm is connected to the seat frame element via an upper link and arranged movably, and an inclination adjustment fitting with a first and a second fitting part.

DETAILED DESCRIPTION OF ILLUSTRATIVE EMBODIMENTS

Figure 1A:
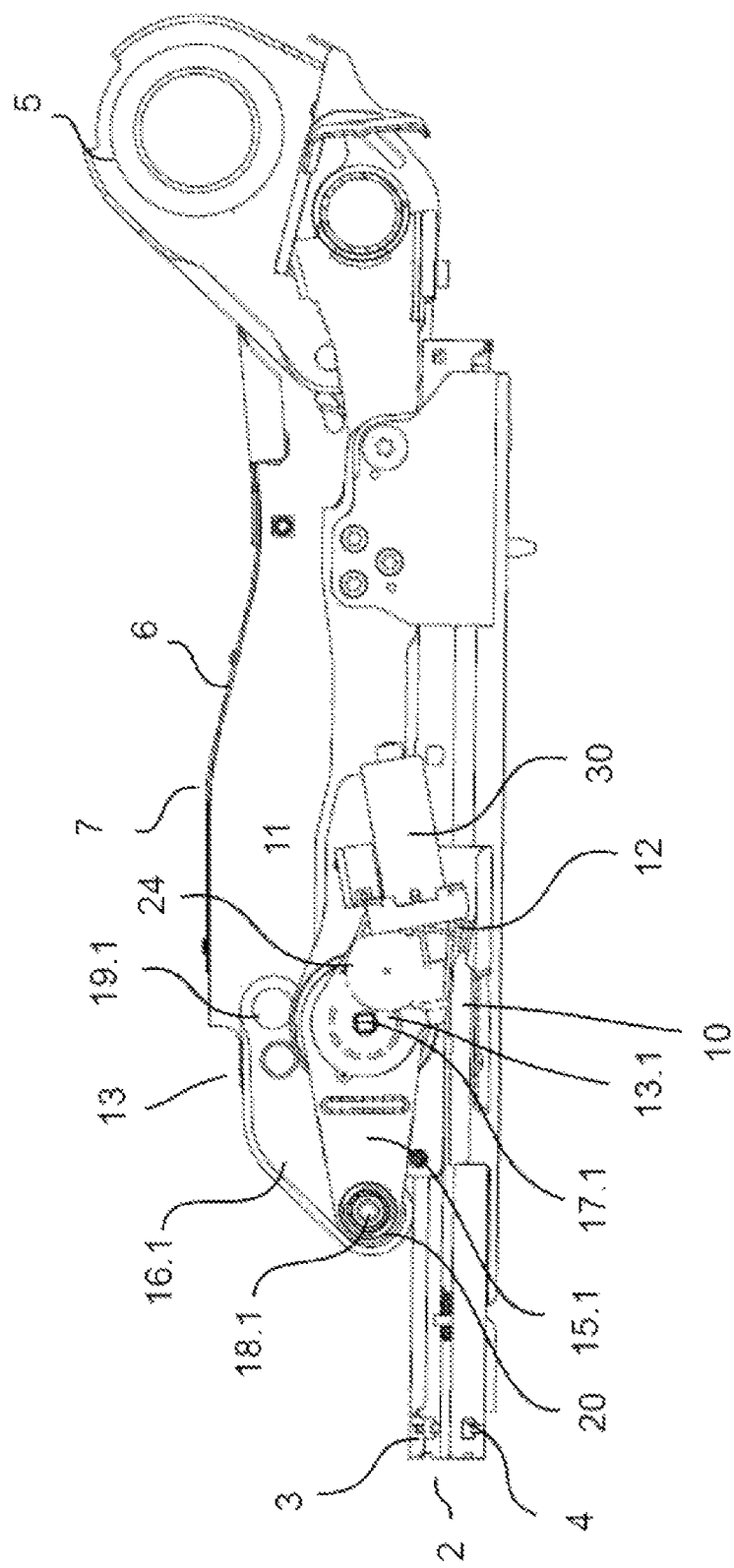
FIG. 1a: is a side view of the right side of the seat inclination adjustment device according to the invention with the seat inclination in the minimum position
Figure 1B:
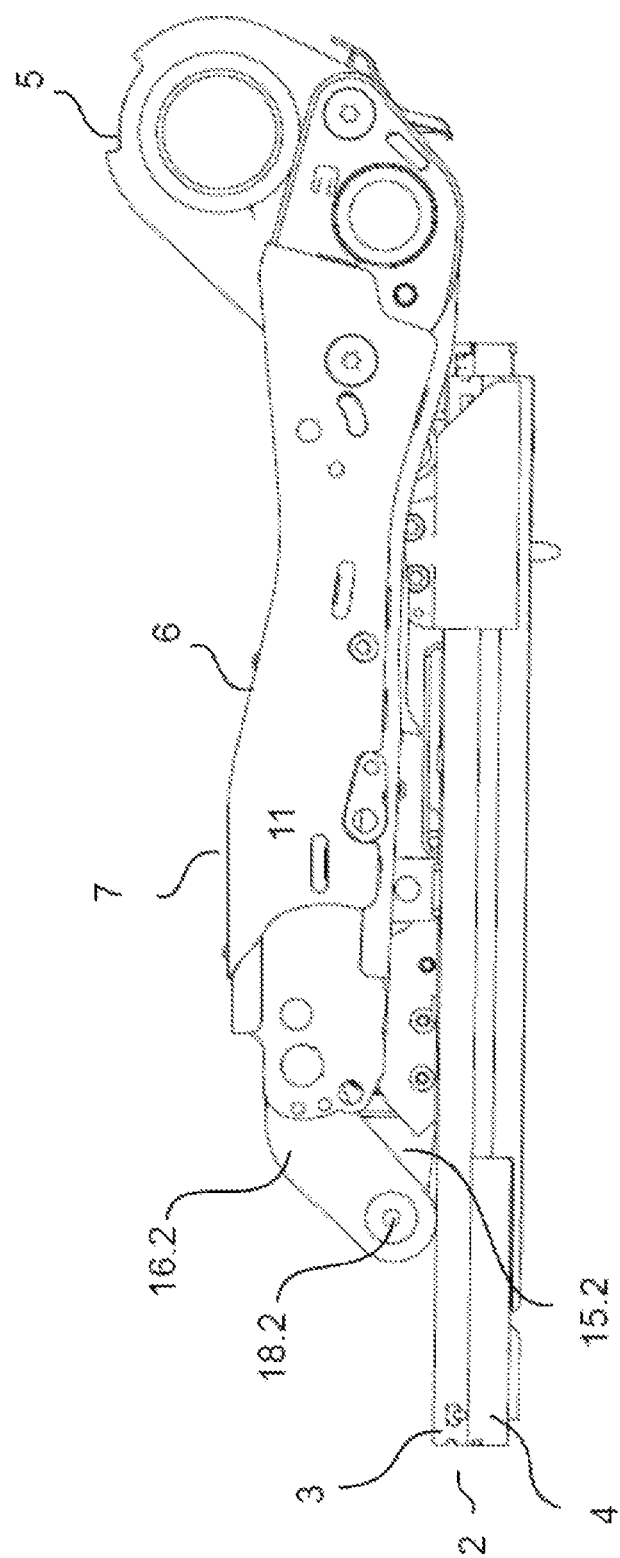
FIG. 1b: is a side view of the right side of the seat inclination adjustment device according to the invention with the seat inclination in the minimum position
Figure 1C:
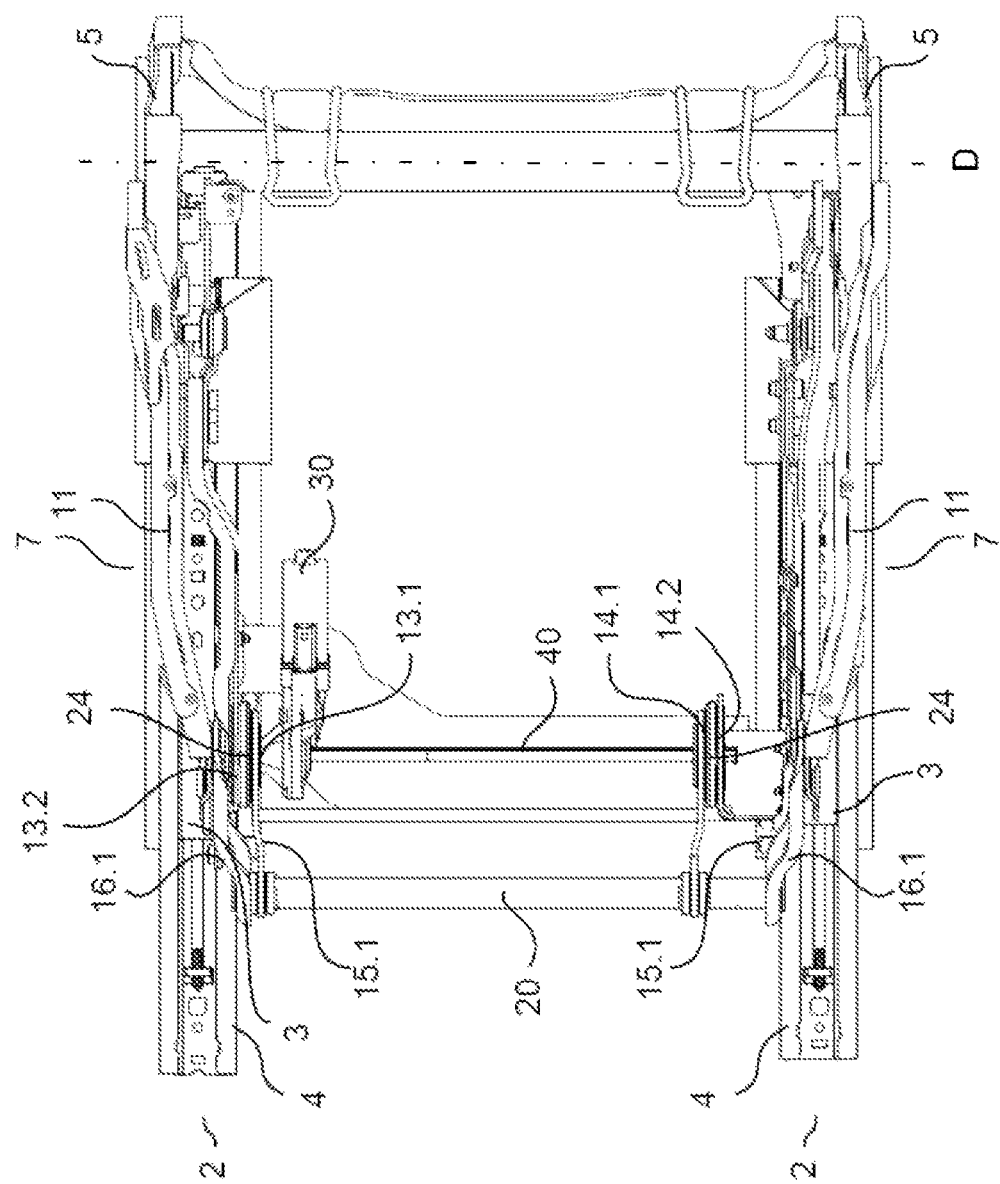
FIG. 1c: is a top view of the seat inclination adjustment device according to the invention with the seat inclination in the minimum position

FIG. 1 shows an exemplary embodiment of the seat inclination adjustment device 10 according to the invention, with the seat inclination being adjusted in the minimum position. The motor vehicle seat 1 has a seat frame 7 for a seat cushion 6 and a backrest 5 which is pivotably mounted on the seat frame 7. The longitudinal seat adjustment 2 has an upper rail 3 and a lower rail 4 (FIG. 1c). The motor vehicle seat 1 is firmly connected to the upper rail 3, which in turn is guided in the lower rail 4 so that it can be adjusted in the longitudinal direction. The lower link 17.1, 17.2 is connected to the lower link arm 15.1, 15.2. The lower link arm 15.1, 15.2 is pivotally connected to the upper link arm 16.1, 16.2 by the middle link 18.1, 18.2 via a link rod 20 (FIG. 1c). The upper link arm 16.1, 16.2 is pivotally connected to the seat frame element 11 by the upper link 19.1, 19.2.

In the minimum position of the seat inclination adjustment device 10 shown in this figure, the lower link arm 15.1, 15.2 is aligned almost horizontally, the lower link arm 15.1, 15.2 and the upper link arm 16.1, 16.2 having an angle of less than 90° to one another. In order to adjust the inclination of the seat frame 7 about the axis of rotation D, the motor vehicle seat 1 is provided with the seat inclination adjustment device 10. The seat inclination adjustment device 10 is arranged on the front side of the motor vehicle seat 1 (FIGS. 1a, b).

The seat inclination adjustment device 10 has the base element 12, which is fixedly arranged on the upper rail 3, and a respective inclination adjustment fitting 24, 25 on each of the two longitudinal sides of the motor vehicle seat 1. The seat inclination adjustment device 10 is driven via a geared motor 30. The adjustment motor 30 is an electric motor which is designed to be reversible, namely the direction of rotation of the electric motor 30 can be reversed in order to drive the adjustment of the seat frame 7 in two directions (up, down) by generating a force. The motor 30 is attached to the base element 12 and connected to the first actuator element 13.

The first inclination adjustment fitting 24 has the first actuator element 13 (FIG. 1a). The first actuator element 13 has a first fitting part 13.1 (gear wheel with external teeth), which is firmly connected to the motor. The second fitting part 13.2 (gear wheel with internal teeth) is connected in the axis of rotation of the lower link 17.1 and is in engagement with the first fitting part 13.1. The second inclination adjustment fitting 25 (FIG. 1b) has the second actuator element 14. The second actuator element 14 (FIG. 1b) has a mirror inverted construction with respect to the first actuator element 13 and also has a first fitting part 14.1 (gear wheel with external teeth). The second fitting part 14.2 (gear wheel with internal teeth) is connected in the axis of rotation of the lower link 17.2 and is in engagement with the first fitting part 14.1. The actuator elements 13, 14 themselves are arranged as mirror images on opposite longitudinal sides of the motor vehicle seat 1 (FIG. 1c) and are constructed mirror-symmetrically to one another. The two actuator elements 13, 14 are connected to one another via the shaft 40 in the axis of rotation of the lower links 17.1, 17.2.

To adjust the seat inclination, the motor 30 is put into operation, which drives the first fitting part 13.1 of the first actuator element 13 and, via the shaft 40, the first fitting part 14.1 of the second actuator element 14 at the same speed. As a result, the second fitting parts 13.2, 14.2 are set in rotary motion and pivot the lower link arms 15.1, 15.2 about the lower links 17.1, 17.2 (see FIG. 2). The lower link arms 15.1, 15.2 pivot the upper link arms 16.1, 16.2, which are pivotally connected to the lower link arms 15.1, 15.2 by the middle links 18.1, 18.2 via a link rod 20. The angle between the lower link arm 15.1, 15.2 and the upper link arm 16.1, 16.2 is increased, the seat frame 7 pivots about the axis of rotation D.

Figure 2:
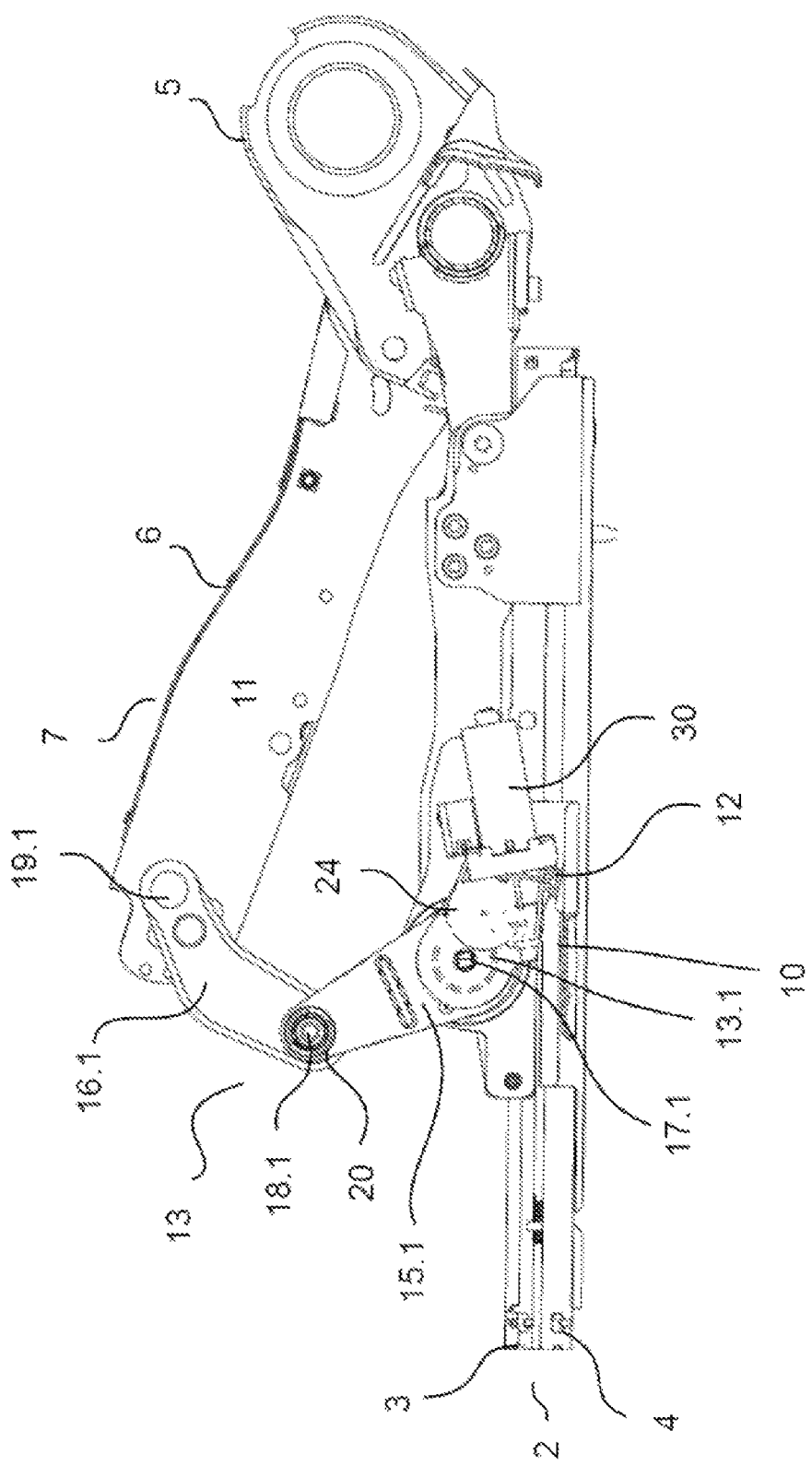
FIG. 2: is a side view of the right side of the seat inclination adjustment device according to the invention with the seat inclination in the minimum position

An exemplary embodiment of the seat inclination adjustment device 10 according to the invention, with the seat inclination being adjusted in the maximum position, is shown in FIG. 2. The seat inclination adjustment device 10 is described in the previous figure (see FIG. 1a). The first inclination adjustment fitting 24 has the first actuator element 13. The first actuator element 13 has a first fitting part 13.1, which is firmly connected to the motor. The second fitting part 13.2 is connected in the axis of rotation of the lower link 17.1 and is in engagement with the first fitting part 13.1. The lower link arm 15.1, 15.2 is aligned almost vertically, the lower link arm 15.1, 15.2 and the upper link arm 16.1, 16.2 having an angle greater than 90° to one another.

Figure 3:
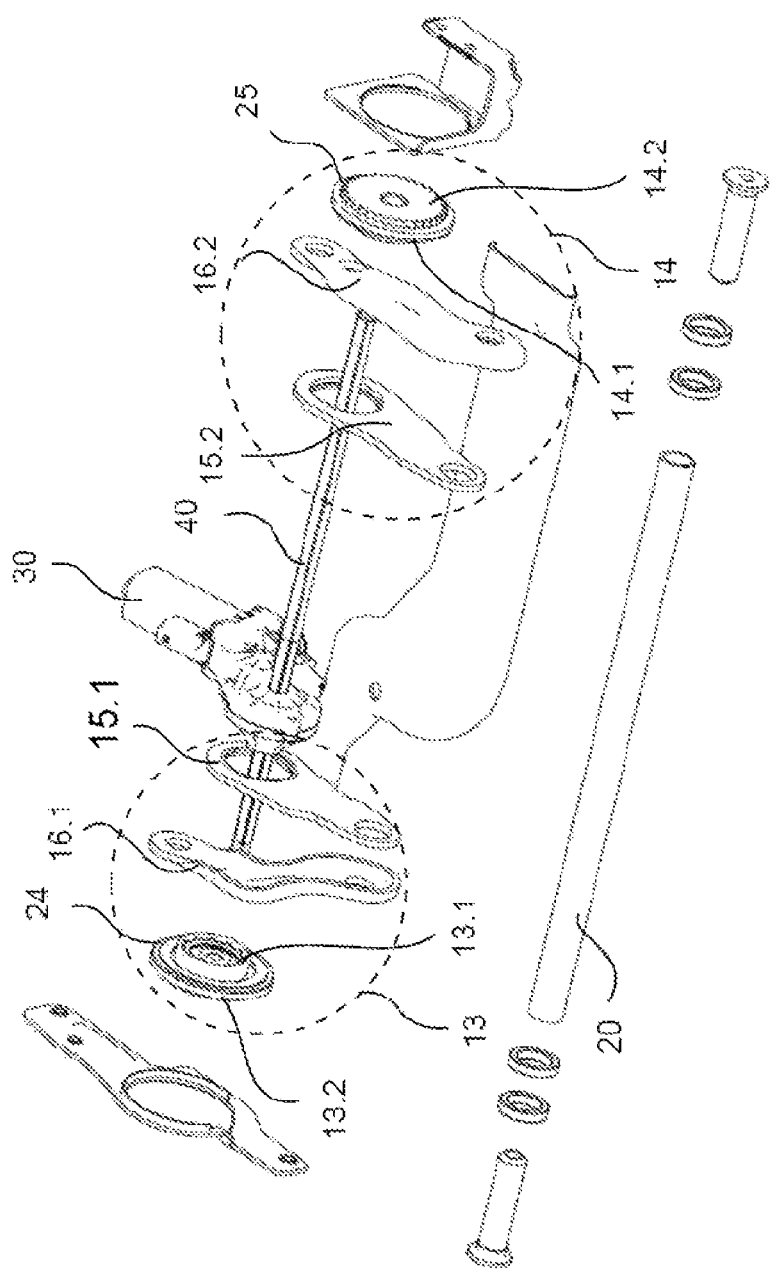
FIG. 3: is an exploded view of the seat inclination adjustment device according to the invention

FIG. 3 shows an exploded view of an exemplary embodiment of the seat inclination adjustment device 10 according to the invention. The seat inclination adjustment device 10 is arranged on the front of the motor vehicle seat 1. The seat inclination adjustment device 10 is provided with the base elements 12 which are fixed to the upper rails 3 of a longitudinal seat adjustment 2 (not shown). The base elements 12 are connected to the lower link arms 15.1, 15.2 via lower links 17.1, 17.2. The lower link arms 15.1, 15.2 are pivotally connected to the upper link arms 16.1, 16.2 by middle links 18.1, 18.2 via a link rod 20. An inclination adjustment fitting (24, 25) is arranged on each of the two longitudinal sides of the motor vehicle seat 1.

The seat inclination adjustment device 10 is driven by a geared motor 30 which is arranged on the first inclination adjustment fitting 24.

The first inclination adjustment fitting 24 has the first actuator element 13. The first actuator element 13 has a first fitting part 13.1, which is firmly connected to the motor. The second fitting part 13.2 is connected in the axis of rotation of the lower link 17.1 and is in engagement with the first fitting part 13.1. The second inclination adjustment fitting 25 has the second actuator element 14. The second actuator element 14 has a mirror inverted construction with respect to the first actuator element 13 and also has a first fitting part 14.1. The second fitting part 14.2 is connected in the axis of rotation of the lower link 17.2 and is in engagement with the first fitting part 14.1. The actuator elements 13, 14 themselves are arranged as mirror images on opposite longitudinal sides of the motor vehicle seat 1 and are constructed mirror-symmetrically to one another. The two actuator elements 13, 14 are connected to one another via the shaft 40 in the axis of rotation of the lower links 17.1, 17.2. Alternatively, the second inclination adjustment fitting 25 can also have a motor, in which case the shaft 40 is omitted. The motor of the second inclination adjustment fitting 25 drives the first fitting part 14.1, analogously to the driving of the first fitting part 13.1 by the motor of the first inclination adjustment fitting 24.

Figure 4A:
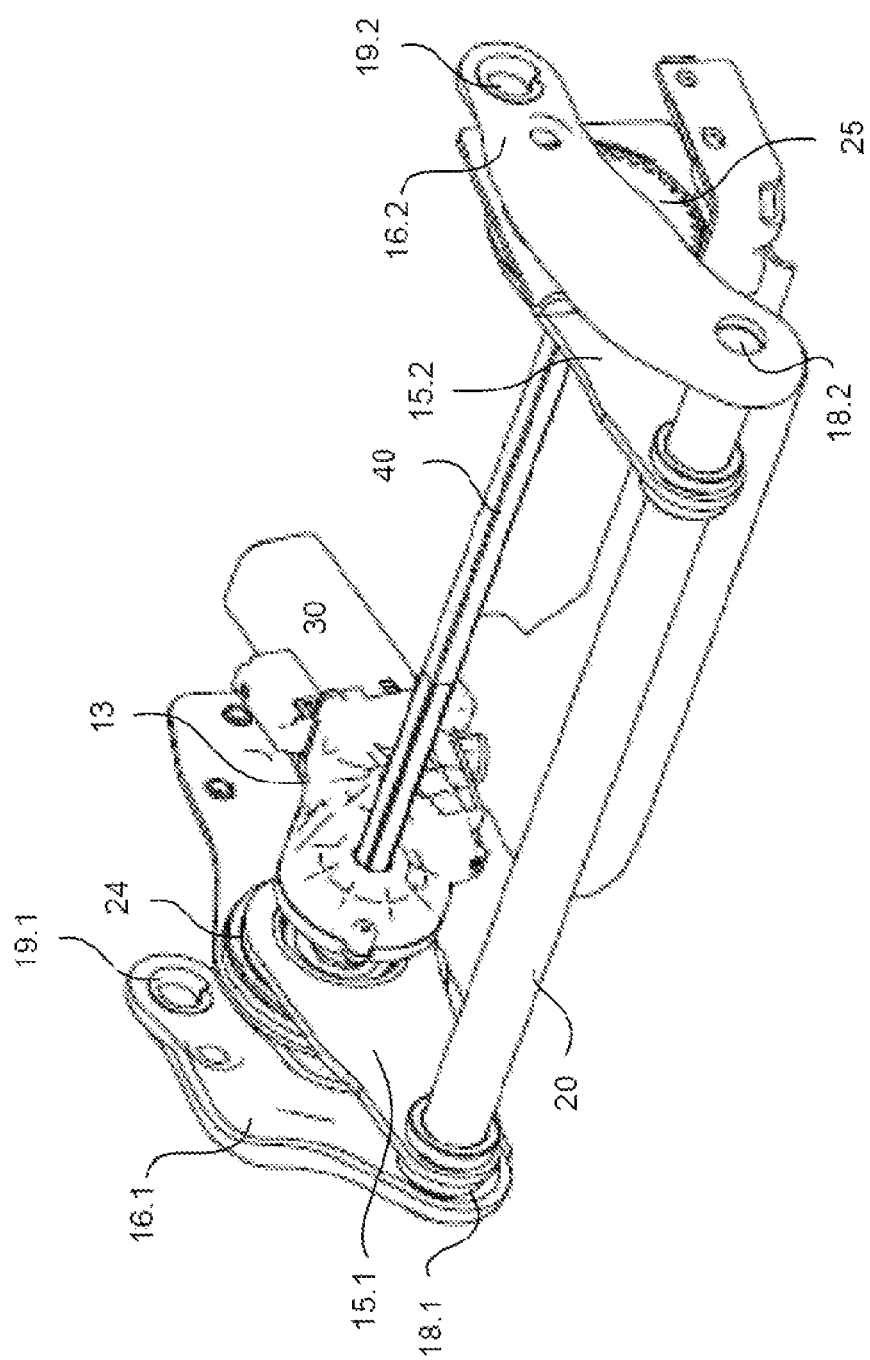
FIG. 4a: is a perspective view of the seat inclination adjustment device according to the invention
Figure 4B:
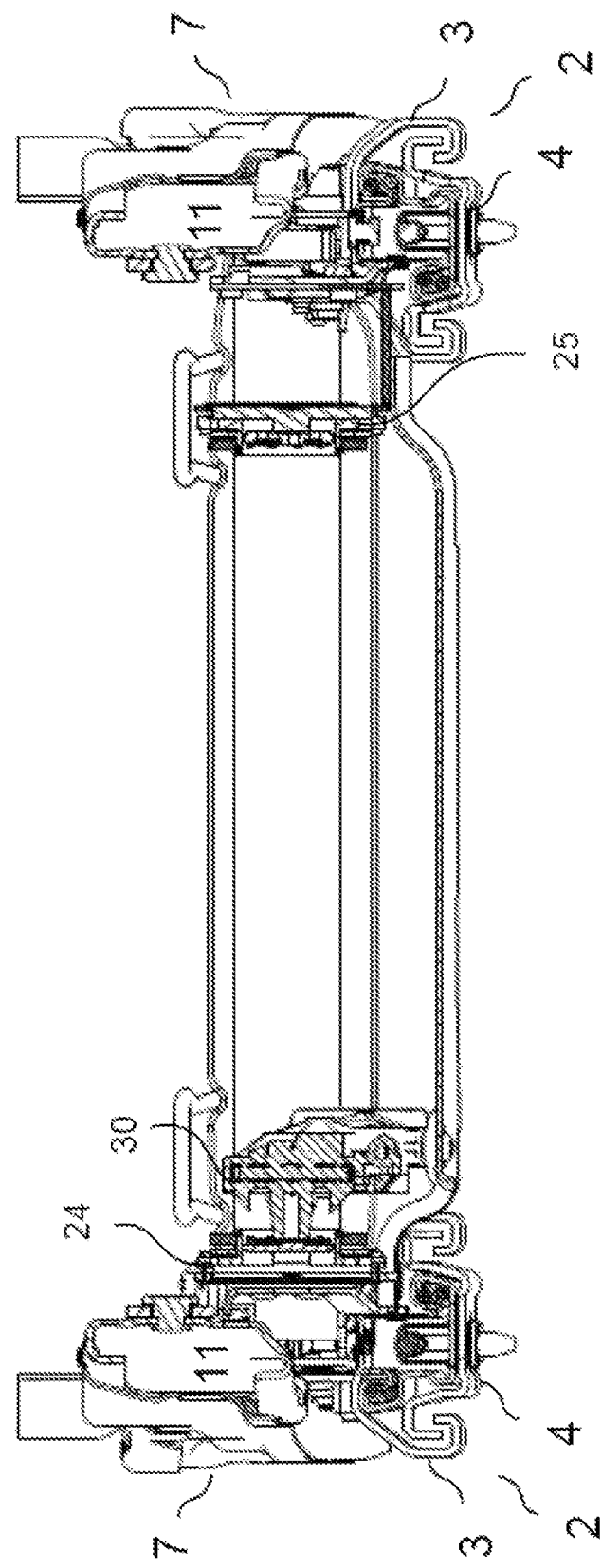
FIG. 4b: is a front view of the seat inclination adjustment device according to the invention

An exemplary embodiment of the seat inclination adjustment device 10 according to the invention, mounted ready for use on a motor vehicle seat 1, is shown in FIG. 4. The seat inclination adjustment device 10 is that shown in the previous figures (see FIGS. 1-3). The seat inclination adjustment device 10 has the base element 12, which is fixedly arranged on the upper rail 3, and a respective inclination adjustment fitting 24, 25 on each of the two longitudinal sides of the motor vehicle seat 1 (FIG. 4a). The electric motor 30 is connected to the first fitting part 13.1 of the first actuator element 13, which in this exemplary embodiment is arranged on the right longitudinal side of the motor vehicle seat 1 (FIG. 4b), and drives the first fitting part 13.1 to adjust the seat inclination. The first fitting part 14.1 of the second actuator element 14 is driven via the shaft 40. The first fitting parts 13.1, 14.1 are in engagement with the second fitting parts 13.2, 14.2, the second fitting parts 13.2, 14.2 being fixedly arranged in the axis of rotation of the lower links 17.1, 17.2. The lower link arms 15.1, 15.2 pivot the upper link arms 16.1, 16.2, which are pivotally connected to the lower link arms 15.1, 15.2 by the middle links 18.1, 18.2 via a link rod 20. The angle between the lower link arm 15.1, 15.2 and the upper link arm 16.1, 16.2 is increased, the seat frame 7 pivots about its axis of rotation D. The invention shown here makes it possible to withstand greater forces than in previously known seat inclination adjustment devices, especially during a frontal collision. In addition, due to the small dimensions of the seat inclination adjustment device 10 according to the invention, it is possible to mount the actuator elements 13, 14 symmetrically, which causes an even distribution of force on the longitudinal sides during an accident. At the same time, due to the small dimensions, the seat inclination adjustment device 10 according to the invention can be implemented in motor vehicle seats that are provided with an integrated belt system. The seat inclination adjustment device 10 is based on standardized drive elements which are tested and known.

LIST OF REFERENCE NUMERALS

1 Motor vehicle seat
2 longitudinal seat adjustment
3 upper rail
4 lower rail
5 backrest
6 seat cushion
7 seat frame
10 seat inclination adjustment device
11 seat frame element
12 base element
13 1st actuator element
13.1 1st fitting part of the 1st actuator element
13.2 2nd fitting part of the 1st actuator element
14 2nd actuator element
14.1 1st fitting part of the 2nd actuator element
14.2 2nd fitting part of the 2nd actuator element
15.1, 15.2 lower link arm
16.1, 16.2 upper link arm
17.1, 17.2 lower link
18.1, 18.2 middle link
19.1, 19.2 upper link
20 link rod
24 1st inclination adjustment fitting
25 2nd inclination adjustment fitting
30 motor
40 shaft
D axis of rotation

The invention claimed is:

1. A motor vehicle seat with a seat inclination adjustment device, with
   a first base element,
   a first seat frame element, and
   a first actuator element,
   wherein the actuator element
      has a lower link arm which is connected to the base element via a lower link and is movably arranged relative to the base element,
      has an upper link arm which is connected to the lower link arm via a middle link and is movably arranged relative to the lower link arm,
      wherein the upper link arm is connected to the seat frame element via an upper link and is movably arranged, and
      has an inclination adjustment fitting with a first fitting part and a second fitting part,
      wherein the inclination adjustment fitting is arranged on one of the links characterized in that the seat inclination adjustment device has a motor and the inclination adjustment fitting can be driven by a motor characterized in that
the seat inclination adjustment device has a second actuator element and
the two actuator elements each have a separate motor.

2. The motor vehicle seat with a seat inclination adjustment device according to claim 1
characterized in that
the upper link is arranged on the front side of the seat frame element.

3. The motor vehicle seat with a seat inclination adjustment device according to claim 1
characterized in that
the inclination adjustment fitting is arranged on the lower link.

4. The motor vehicle seat with a seat inclination adjustment device according to claim 1
characterized in that
the motor is a geared motor.

5. The motor vehicle seat with a seat inclination adjustment device according to claim 4
characterized in that
the motor is arranged on the base element.

6. The motor vehicle seat with a seat inclination adjustment device according to claim 1
characterized in that
the inclination adjustment fitting is arranged in the force flow of a force which acts on the motor vehicle seat in the event of a (frontal) crash.

7. The motor vehicle seat with a seat inclination adjustment device according to claim 1
characterized in that
the first actuator element is arranged on the right side and the second actuator element on the left side of the seat.

8. The motor vehicle seat with a seat inclination adjustment device according to claim 1
characterized in that
the inclination adjustment fitting of the first actuator element and the inclination adjustment fitting of the second actuator element are connected via a shaft.

9. The motor vehicle seat with a seat inclination adjustment device according to claim 1
characterized in that
the first fitting part is pivotably connected to the second fitting part.

10. The motor vehicle seat with a seat inclination adjustment device according to claim 1
characterized in that
the first fitting part has internal teeth and the second fitting part has external teeth.

11. A method for adjusting the seat inclination of a motor vehicle seat having
a base element,
a lower link arm which is connected to the base element via a lower link and is movably arranged relative to the base element,
an upper link arm which is connected to the lower link arm via a middle link and is movably arranged relative to the lower link arm,
a seat frame element which is connected to the upper link arm via an upper link and is movably arranged with respect to the upper link arm,
an inclination adjustment fitting with a first fitting part and a second fitting part, wherein the inclination adjustment fitting is arranged on one of the links
characterized in that
the inclination adjustment fitting is driven by a motor; and
the first fitting part is fastened to the base element and the second fitting part is fastened to
the lower link arm.

12. The method for adjusting the seat inclination of a motor vehicle seat according to claim 11
characterized in that
the first fitting part is fastened to a link arm or to the base element or to the seat frame and the second fitting part is fastened to a link arm which is different with respect to the first fitting part.

13. The method for adjusting the seat inclination of a motor vehicle seat according to claim 11
characterized in that
in the event of a (frontal) crash, the force flow of the forces acting on the motor vehicle seat is routed through the inclination adjustment fitting.

14. A motor vehicle seat with a seat inclination adjustment device, with a first base element, a first seat frame element, and a first actuator element, wherein the actuator element has a lower link arm which is connected to the base element via a lower link and is movably arranged relative to the base element, has an upper link arm which is connected to the lower link arm via a middle link and is movably arranged relative to the lower link arm, wherein the upper link arm is connected to the seat frame element via an upper link and is movably arranged, and has an inclination adjustment fitting with a first fitting part and a second fitting part,
wherein the inclination adjustment fitting is arranged on one of the links characterized in that the seat inclination adjustment device has a motor and the inclination adjustment fitting can be driven by a motor characterized in that the first fitting part is fastened to a link arm or to the base element or to the seat frame and the second fitting part is fastened to a link arm which is different with respect to the first fitting part and the first fitting part is fastened to the base element and the second fitting part is fastened to the lower link arm.

* * * * *